United States Patent Office 2,811,503
Patented Oct. 29, 1957

2,811,503

6-ALKOXY-1-NITROSO DIHYDROQUINOLINES FOR CONTROLLING THE VULCANIZATION OF RUBBER AND VULCANIZATES RESISTANT TO OZONE

James F. Hand and Andrew Tomlin, Hudson, Ohio, assignors to Monsanto Chemical Company, St. Louis, Mo., a corporation of Delaware No Drawing. Application July 27, 1954,
Serial No. 446,178

9 Claims. (Cl. 260—41.5)

The present invention relates to an improved method of vulcanizing sulfur vulcanizable rubbers and to vulcanized products of enhanced resistance to degradation. More particularly this invention relates to an improved method of controlling the vulcanization of rubber which inherently results in vulcanizates exhibiting marked resistance to degradation.

The problem of avoiding prevulcanization has been intensified through the increasing use of furnace type carbon blacks. These blacks do not possess the inherent retarding properties of the channel blacks but have a significant economic advantage. Moreover, the desire for higher processing speeds or shorter production cycles intensifies the problem of prevulcanization because the more rapid the mixing the higher the temperature.

Partial solutions of the problem have been achieved by using delayed action type accelerators of which the thiazole sulfenamides are an outstanding example or by the use of acidic materials to retard vulcanization. It has also been proposed to use as the sulfur vulcanizing agent an organic sulfur compound which does not liberate sulfur until near curing temperatures. None of these expedients has proved to be entirely satisfactory. It is common for the effect of one to overshadow another. For instance the delayed action accelerators are not necessarily further retarded by use in combination with acidic materials.

Another aspect of the problem is the requirement of vulcanizates possessing good resistance to degradation. It is now well recognized that the influences causing degradation are not confined to oxygen but ozone plays an important role and that the effects are not necessarily mitigated against by conventional antioxidants. Moreover, it was found that organic sulfur vulcanizing agents were deficient in resistance to flex cracking.

In accordance with the present invention a method of compounding has been discovered whereby remarkable resistance to prevulcanization is achieved coupled with the production of vulcanizates which are resistant to attack by ozone. The accelerating component is a delayed action sulfenamide accelerator which is used in conjunction with a compound which has the property of controlling vulcanization during processing and imparting resistance to ozone degradation to the vulcanizates. The latter is a 6-alkoxy-1-nitrosodihydroquinoline. These compounds exert a powerful retarding action on sulfenamide accelerators but are not outstanding with other types. They may be prepared by nitrosation of 6-alkoxy-dihydroquinolines in known manner, J. C. S. 1933, p. 1329. The dihydroquinolines are conveniently prepared by condensing an alkoxy aniline with a ketone. It is now generally accepted that these condensation products are substituted dihydroquinolines. For example the following structure has been assigned for the nucleus of the dihydroquinolines where R represents an alkyl radical

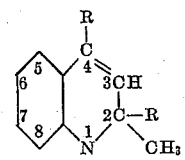

The compounds employed in the present invention have a nitroso group in the 1-position and an alkoxy group in the 6-position. Suitable examples are methoxy, ethoxy, propoxy, isopropoxy, butoxy and amoxy groups.

As examples of the invention rubber stocks were compounded comprising

| Stock | A | B |
|---|---|---|
| | Parts by weight | |
| Smoked sheets | 100 | 100 |
| Furnace carbon black (Philblack O) | 50 | 50 |
| Zinc oxide | 5 | 5 |
| Stearic acid | 2 | 2 |
| Saturated hydrocarbon softener | 3 | 3 |
| N-Cyclohexyl-2-benzothiazole sulfenamide | 0.5 | 0.5 |
| Sulfur | 2.5 | 2.5 |
| 6-Ethoxy 1,2-dihydro-2,2,4-trimethyl-1-nitrosoquinoline | | 1.0 |

The resistance of the stocks to prevulcanization (scorch) was evaluated by means of an NBS model Mooney viscometer at 121° C. following A. S. T. M. D1077–49T with the exception that the scorch point was taken at 10 units higher than the minimum instead of 5 units. Also shown in the table below are the modulus and tensile properties of the optimum (30 minute) cures of the vulcanizates obtained by heating in the usual manner in a press at 144° C.

Table I

| Stock | Mooney Scorch in minutes at 121° C. | Modulus of Elasticity in lbs./in.² at Elongation of 300% | Tensile at Break in lbs./in.² | Ult. Elong., percent |
|---|---|---|---|---|
| A | 17 | 2,610 | 3,935 | 450 |
| B | 24 | 2,313 | 3,923 | 480 |

To illustrate the resistance of the vulcanizates to ozone, stocks were compounded comprising

| Stock | C | D | E | F |
|---|---|---|---|---|
| | Parts by weight | | | |
| Smoked sheets | 100 | 100 | | |
| Butadiene-styrene copolymer rubber | | | 100 | 100 |
| Philblack O | 50 | 50 | 40 | 40 |
| Philblack A | | | 10 | 10 |
| Zinc oxide | 5 | 5 | 4 | 4 |
| Stearic acid | 3 | 3 | 2 | 2 |
| Sulfur | 2.5 | 2.5 | 1.75 | 1.75 |
| Saturated hydrocarbon softener | 3 | 3 | 10 | 10 |
| N-Cyclohexyl 2-benzothiazole sulfenamide | 0.8 | 0.8 | 1.2 | 1.2 |
| 6-Ethoxy-1,2-dihydro-2,2,4-trimethyl-1-nitrosoquinoline | | 1.5 | | 1.5 |

Stocks C and D were cured by heating for 30 minutes in a press at 142° C. and stocks E and F were cured by heating for 60 minutes in a press at 144° C. Since evaluation under static conditions is not indicative of the service obtained with many types of rubber articles which must withstand flexing, the vulcanized compositions were evaluated under dynamic conditions in an atmosphere containing a definite concentration of ozone. The test is carried out in the following manner: Samples of the stocks are cured in the form of a belt ½" wide, ¼" thick and 5 9/16" diameter and mounted on 1" diameter shafts. The ozone concentration is maintained at 20-30 parts per hundred million throughout the test and the shafts are rotated at 75 R. P. M. In this manner a momentary elongation through a range of 0-20% is provided at any portion of the test specimen passing over the shaft. (The apparatus and procedure employed is described in a paper of Creed et al. entitled "An Apparatus for the Evaluation of Ozone Protective Agents for Elastomers Under Dynamic Conditions" given at the Cincinnati, Ohio, Meeting of the Rubber Division of the American Chemical Society May 1, 1952.) The experimental test specimens are compared visually at various intervals noting the extent of cracking. A stock which is severely cracked has no service life remaining in terms of the useful life of a rubber article and where the cracking is designated as extremely severe the degradation is well beyond even this point. The results of the tests are set forth below:

*Table II*

| Stock | Surface Cracking After flexing in Ozone for— | | | | |
|---|---|---|---|---|---|
| | 16 Hrs. | 32 Hrs. | 48 Hrs. | 64 Hrs. | 72 Hrs. |
| C | v. slight | slight | slight | moderate | moderate. |
| D | none | none | none | none | v. slight. |
| E | v. slight | slight | severe | v. severe | v. severe. |
| F | none | none | none | v. slight | v. slight. |

Control of the vulcanization process has been proposed by use of an N,N'-dithioamine derived from non-aromatic secondary amines as the sulfur vulcanizing agent but the vulcanizates proved to be deficient in resistance to flex cracking. For example, replacing the sulfur in stock A by 3.5 parts of N,N'-dithiobismorpholine produces a vulcanizate having inferior flex cracking resistance but this can be overcome by the addition of a 6-alkoxy dihydroquinoline. In practice it is preferred to reduce the thioamine, say to 1.5 parts, and add a small amount of elemental sulfur. Excellent results are obtained with 0.8 part of elemental sulfur in this combination with 1.0-1.5 parts of the nitroso compound which latter serves to overcome the prevulcanizing tendency introduced by the elemental sulfur.

Examples of typical suitable nitrosoquinolines are:

1,2-dihydro-6-methoxy-2,2,4-trimethyl-1-nitrosoquinoline,
1,2-dihydro-6-propoxy-2,2,4-trimethyl-1-nitrosoquinoline,
1,2-dihydro-6-butoxy-2,2,4-trimethyl - 1 - nitrosoquinoline and
1,2 - dihydro - 6 - isopropoxy - 2,2,4 - trimethyl - 1 - nitrosoquinoline.

Typical examples of thioamines suitable for use in the invention comprise N,N'-dithio-bis-dimethylamine, N,N'-dithio - bis - diethylamine, N,N'-dithio-bis-dipropylamine, N,N'-dithio-bis-diisopropylamine, N,N'-dithio-bis-dibutylamine, N,N'-dithio-bis-diisobutylamine, N,N'-dithio-bis-diamylamine, N,N'-dithio-bis-dihexylamine, N,N'-dithiobis - diheptylamine, and N,N'-dithio-bis-dioctylamine. Even higher groups such as nonyl, decyl, undecyl and dodecyl may be present but the molecular weight becomes so high that the limits of practical dosage are exceeded. Still further examples are N,N'-dithio-bis-dicyclohexylamine, N,N'-dithio-bis-ditetrahydrofurylamine, N,N'-dithio - bis - ditetrahydrothienylamine, N,N'-dithio-bis-di-β-cyanoethylamine, N,N'-dithio-bis-di-β-chlorethylamine, N,N'-dithio-bis-di-β-phenethylamine, N,N'-dithio-bis-dibenzylamine, N,N'-dithio-bis-ditetrahydrofurfurylamine, N,N'-dithio-bis-ditetrahydrothienylamine, N,N'-dithio-bis-N-methylcyclohexylamine, N,N'-dithio-bis-N-ethylcyclohexylamine, N,N'-dithio-bis-N-isopropylcyclohexylamine, N,N'-dithio-bis-methylaminoacetonitrile, N,N'-dithio-bis-ethylaminoacetonitrile, N,N'-dithio-bis-propylaminoacetonitrile, N,N'-dithio-bis-butylaminoacetonitrile, N,N'-dithio-bis-methylaminopropionitrile, N,N'-dithio-bis-ethylaminopropionitrile, N,N'-dithio-bis-isopropylaminopropionitrile, N,N'-dithio-bis-butylaminopropionitrile, N,N'-dithio-bis-amylaminopropionitrile, N,N'-dithio-bis-octylaminopropionitrile, N,N'-dithio-bis-octadecylaminopropionitrile, N,N' - dithio-bis-N-methyltetrahydrofurfurylamine, N,N'-dithio-bis-N-ethyltetrahydrofurfurylamine, N,N'-dithio-bis-isopropyltetrahydrofurfurylamine, N,N'-dithio-bis-N-isobutyltetrahydrofurfurylamine, N,N' - dithio-bis-N-cyclohexyltetrahydrofurfurylamine, N,N'-dithio-bis-N-cyclohexyltetrahydrothienylamine, N,N'-dithiobis - cyclohexylaminoacetonitrile, N,N' - dithio-bis-cyclohexylaminopropionitrile, N,N'-dithio-bis-tetrahydrofurylaminopropionitrile, N,N'-dithio-bis-piperidine, N,N'-dithio-bis-α-pipecoline and N,N'-dithio-bis-morpholine.

The N,N'-monothioamines, as for example N,N'-thio-bis-morpholine, N,N'-thio-bis-dimethylamine, N,N'-thio-bis-diethylamine, N,N'-thio-bis-dipropylamine, N,N'-thio-bis-diisopropylamine, are vulcanizing agents but less efficient vulcanizing agents. The N,N'-trithio and tetrathioamines are very efficient vulcanizing agents and their activity can be controlled by use in conjunction with a nitrosamine as herein defined.

The amounts of the nitroso compounds will vary depending upon the particular stock and results desired. Significant effects are obtained both in vulcanization control and ozone resistance of the vulcanizates with 0.25 part and both effects are further markedly enhanced by increasing amounts at least up to 1.5 parts on the rubber. For a high measure of protection under severe conditions, as for example ordnance tires, 5 parts on the rubber may be indicated.

Of course other delayed action thiazole sulfenamide accelerators may be used than those chosen to illustrate the invention. Other examples are N-tert-octyl-2-benzothiazole sulfenamide, N,N-diethyl-2-benzothiazole sulfenamide, N-isopropyl 2-benzothiazole sulfenamide, N,N-diisopropyl-2-benzothiazole sulfenamide, 1-(2-benzothiazolyl sulfenyl)piperidine, 4-(2-benzothiazolylsulfenyl)-morpholine, N-tert-butyl-2-benzothiazole sulfenamide, N-β-phenethyl 2-benzothiazole sulfenamide described in co-pending application of Robert H. Cooper et al., Serial No. 301,968, filed July 31, 1952, and N,N-dimethyl 2-benzothiazole sulfenamide. Other examples are described in co-pending application of John J. D'Amico, Serial No. 380,874, filed September 17, 1953.

The improved vulcanizing system is advantageous for use with any sulfur vulcanizable polymeric unsaturated rubbery materials. Examples are the varieties of natural crude rubber, a polymer considered to contain multiple isoprene units, synthetic diene polymers, as for example homopolymers of butadiene, isoprene, 2,3-dimethylbutadiene and copolymers of these monomers with styrene, acrylonitrile and isobutylene.

It is intended to cover all changes and modifications of the examples of the invention herein chosen for purposes of disclosure which do not constitute departures from the spirit and scope of the invention.

What is claimed is:

1. A method of vulcanizing a sulfur vulcanizable diene hydrocarbon rubber which comprises heating the rubber with a sulfur vulcanizing agent in the presence of a delayed action thiazole sulfenamide accelerator and a 6-alkoxy-1,2-dihydro-1-nitroso-2,2,4 - trialkylquinoline in a proportion sufficient to inhibit both premature vulcanization during processing and ozone cracking of the vulcanizate.

2. A method of vulcanizing a sulfur vulcanizable diene hydrocarbon rubber which comprises heating the rubber with a sulfur vulcanizing agent in the presence of a delayed action thiazole sulfenamide accelerator and a 6-alkoxy-1,2-dihydro-1-nitroso-2,2,4 - trimethylquinoline in which the alkoxy group contains less than six carbon atoms in a proportion sufficient to inhibit both premature vulcanization during processing and ozone cracking of the vulcanizate.

3. A method of vulcanizing a sulfur vulcanizable diene hydrocarbon rubber which comprises heating the rubber with a sulfur vulcanizing agent in the presence of N-cyclohexyl 2-benzothiazole sulfenamide and 6-ethoxy-1,2-dihydro-1-nitroso-2,2,4-trimethylquinoline in a proportion sufficient to inhibit both premature vulcanization during processing and ozone cracking of the vulcanizate.

4. A method of vulcanizing a sulfur vulcanizable diene hydrocarbon rubber which comprises heating the rubber with a sulfur vulcanizing agent in the presence of 4-(2-benzothiazolylsulfenyl)morpholine and 6-ethoxy-1,2 - dihydro-1-nitroso-2,2,4-trimethylquinoline in a proportion sufficient to inhibit both premature vulcanization during processing and ozone cracking of the vulcanizate.

5. A method of vulcanizing a sulfur vulcanizable diene hydrocarbon rubber which comprises heating the rubber with a sulfur vulcanizing agent in the presence of N-tert-butyl-2-benzothiazole sulfenamide and 6-ethoxy-1,2-dihydro-1-nitroso - 2,2,4 - trimethylquinoline in a proportion sufficient to inhibit both premature vulcanization during processing and ozone cracking of the vulcanizate.

6. A method of vulcanizing a sulfur vulcanizable diene hydrocarbon rubber which comprises heating the rubber with an N,N'-dithio secondary amine vulcanizing agent in the presence of a delayed action thiazole sulfenamide accelerator and a 6-alkoxy-1,2-dihydro - 1 - nitroso-2,2,4-trialkylquinoline in a proportion sufficient to inhibit both premature vulcanization during processing and ozone cracking of the vulcanizate.

7. A method of vulcanizing a sulfur vulcanizable diene hydrocarbon rubber which comprises heating the rubber with a furnace carbon black and a sulfur vulcanizing agent in the presence of a delayed action thiazole sulfenamide accelerator and a 6-alkoxy-1,2-dihydro-1-nitroso-2,2,4-trialkylquinoline in a proportion sufficient to inhibit both premature vulcanization during processing and ozone cracking of the vulcanizate.

8. A vulcanized rubber product resistant to degradation by ozone obtained by heating a sulfur vulcanizable diene hydrocarbon rubber with a sulfur vulcanizing agent in the presence of a delayed action thiazole sulfenamide accelerator and a 6-alkoxy-1,2-dihydro-1 - nitroso - 2,2,4-trimethylquinoline in which the alkoxy group contains less than six carbon atoms in a proportion sufficient to inhibit both premature vulcanization during processing and ozone cracking of the vulcanizate.

9. A sulfur vulcanizable diene hydrocarbon rubber having incorporated therein N,N'-dithiobismorpholine, a delayed action thiazole sulfenamide accelerator and a 6-alkoxy-1,2-dihydro-1-nitroso-2,2,4 - trimethylquinoline in which the alkoxy group contains less than six carbon atoms the amount of the said nitrosoquinoline being sufficient further to delay premature vulcanization during processing and to inhibit flex cracking and ozone cracking of the vulcanizate.

No references cited.